United States Patent [19]

Stephany et al.

[11] Patent Number: 5,642,218
[45] Date of Patent: Jun. 24, 1997

[54] METHOD FOR CREATING A MULTI-FACETED POLYGON FOR A LASER WRITER

[75] Inventors: Thomas M. Stephany, Churchville; William Mey, Rochester, both of N.Y.

[73] Assignee: Eastman Kodak Company, Rochester, N.Y.

[21] Appl. No.: 391,796

[22] Filed: Feb. 21, 1995

[51] Int. Cl.$^6$ .................................................. G02B 26/08
[52] U.S. Cl. ........................... 359/216; 359/855; 359/900
[58] Field of Search ................................. 359/216–219, 359/855, 872, 900; 264/1.1, 1.9

[56] References Cited

U.S. PATENT DOCUMENTS

| | | |
|---|---|---|
| 2,988,456 | 6/1961 | Fairbanks et al. ................... 117/35 |
| 4,277,141 | 7/1981 | Kleiber . |
| 4,421,385 | 12/1983 | Yamaguchi ............................ 359/855 |
| 4,892,372 | 1/1990 | Chonan et al. . |
| 4,902,085 | 2/1990 | Murakoshi et al. . |
| 5,361,170 | 11/1994 | Takeyasu ............................... 359/872 |

*Primary Examiner*—James Phan
*Attorney, Agent, or Firm*—Peyton C. Watkins

[57] ABSTRACT

A method for manufacturing a multi-faceted polygon for a laser writer, comprises the steps of creating a plurality of scanning surfaces on the polygon; and creating a step which is positioned on a mounting surface of the polygon for indicating the center of rotation for the polygon.

6 Claims, 2 Drawing Sheets

METHOD FOR CREATING A MULTI-FACETED POLYGON FOR A LASER WRITER

BACKGROUND OF THE INVENTION

1. Field of Invention

The present invention relates generally to a multi-faceted polygon for a laser writer and to a method for creating such a multi-faceted polygon.

2. Background of the Related Art

In laser printing devices, such as laser printers, copiers and similar devices, a laser beam source is directed onto a multi-faceted polygon having a plurality of reflecting surfaces for permitting each surface to reflect the laser beam onto a recording medium, such as film or photographic paper. A circular hole passes through the center of the polygon for receiving a cylindrical shaped motor shaft which rotates the polygon at a constant predetermined angular velocity. As the polygon is rotated within the printing device, each reflecting surface of the polygon successively writes one complete line on the recording medium.

Ideally, each surface of the polygon writes onto the recording medium with a constant exposure level to prevent artifacts due to exposure variations. To provide this constant exposure level, the intensity of the beam and the time it takes for each reflecting surface to write a complete line must remain constant throughout the entire writing process. The beam intensity is relatively easy to maintain at a constant level as is well known in the art. However, if a commercially available polygon is installed into an existing laser writer or if one wishes to assemble their own laser writer using a commercially available polygon, alignment of the polygon to obtain the same writing time for each reflecting surface is time consuming and difficult, as is described in detail below.

This problem arises from the fact that, since each reflecting surface must be maintained at a constant distance from the recording medium, the center of rotation of the polygon must be precisely known. This is difficult because, when the polygon is manufactured, the polygon is placed on a well known and presently utilized grinding apparatus. It is index rotated, with each surface being precisely cut. The result is that each reflecting surface is ground to essentially the same depth. This means that radii drawn perpendicular from the reflecting surfaces, to the center of rotation of the grinding machine, are equal and hereinafter referred to as $d_1$. After this operation, the center of rotation of the grinding machine is the same as the center of rotation of the polygon. Upon removal from the grinding operation, the finished polygon must be placed on the motor shaft of a scanner system. The motor shaft, whose rotational center is the center of rotation for the scanner system should exactly coincide with the center of rotation of the polygon, so that, as the polygon is rotated, each reflecting surface substantially maintains distance $d_1$ from the center of the shaft, thus ensuring quality images.

Presently, locating the center of rotation of the polygon when it is subsequently placed on the laser printer shaft is typically done by complex measuring techniques. However, this is time consuming because the reflecting surfaces may not be physically touched because of their unique physical characteristics. This makes necessary non-contact measurements which are both time consuming and costly.

Consequently, a need exists for providing an improved polygon which includes a means for locating the center of rotation of the polygon when it is thereafter placed on the laser scanner shaft.

SUMMARY OF THE INVENTION

It is an object of the present invention to provide a means on the polygon for indicating the center of rotation for the polygon.

It is an advantage of the present invention to provide a method for measuring the center of rotation of the polygon which is simple to use and is cost effective.

It is a feature of the present invention to provide a step or groove on the polygon for providing a means for indicating the center of rotation for the polygon.

With these objects, advantages and features in view, the present invention resides in a method for manufacturing a multi-faceted polygon for a laser writer, comprising the steps of (a) creating a plurality of scanning surfaces on the polygon; and (b) creating a step or groove on the polygon as a means for indicating the center of rotation for the polygon.

The above and other objects of the present invention will become more apparent when taken in conjunction with the following description and drawings wherein like characters indicate like parts and which drawings form a part of the present invention.

BRIEF DESCRIPTION OF THE DRAWINGS

In the course of the following detailed description, reference will be made to the attached drawings in which.

DETAILED DESCRIPTION OF THE INVENTION

Figure 1:
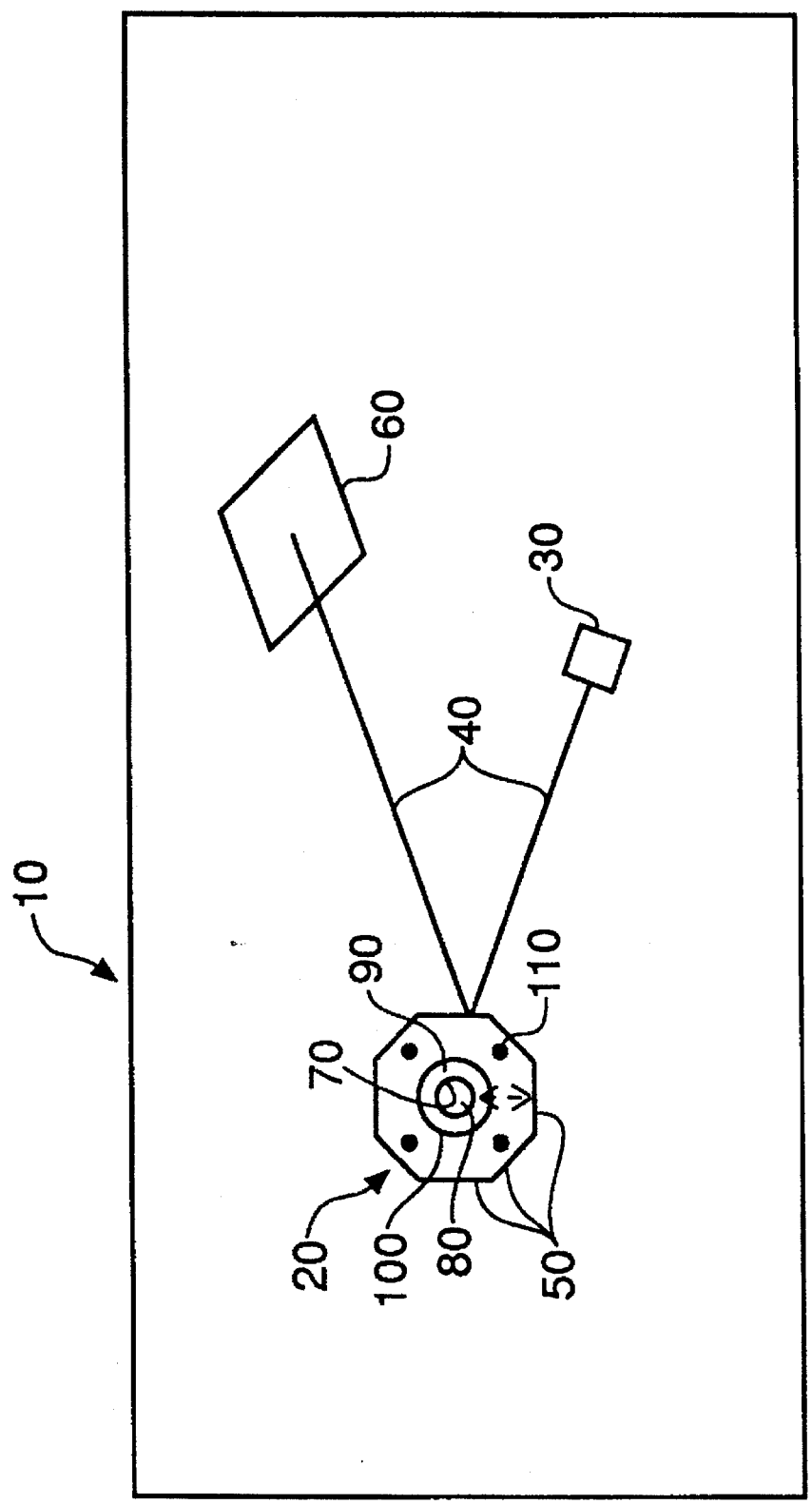
FIG. 1 is a schematic diagram of a polygon laser writer.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Referring to FIG. 1, there is shown a schematic diagram of a typical laser printer 10, which includes a polygon 20 of the present invention, for illustrating the environment of the polygon 20 of the present invention, although the polygon 20 may be implemented on any laser writing device. A laser beam source 30 directs a laser beam 40 on the polygon 20, and the beam 40 is reflected by one of a plurality of reflecting surfaces 50 onto a recording medium 60, such as paper in this embodiment. Although eight reflecting surfaces 50 are shown in the preferred embodiment, the polygon 20 may have any number of reflecting surfaces 50. The polygon 20 is mounted to a surface (not shown) integral with a motor shaft 80 via a plurality of mounting bolts 110 positioned respectively through the polygon. A center hole 70 of the polygon 20 receives a motor shaft 80 for rotating the polygon 20 which, in turn, permits each reflecting surface 50 to successively write an entire line onto the paper. An annular shaped step 90 is integrally machined into a mounting surface of the polygon 20 for permitting a suitable indication device, for example a runout indicator (not shown), to be placed against an outer surface 100 of the step 90 for measuring the runout of the step 90, or the distance in which outer surface 100 varies inwardly or outwardly (see dashed lines) as it is rotated. This runout is used to align the center of rotation of the polygon 20 to the center of rotation of the motor shaft 80.

Figure 2:
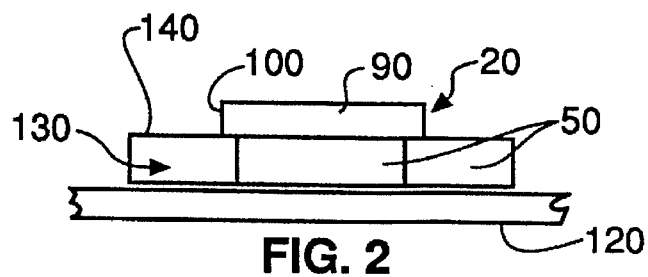
FIG. 2 is a side view of the polygon of the present invention.
Figure 3:
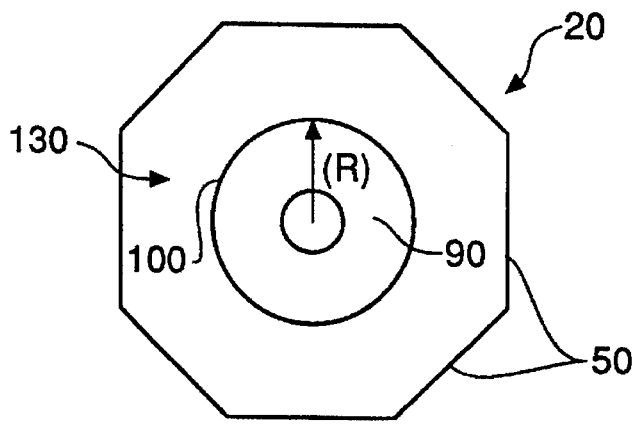
FIG. 3 is a top view of the polygon of the present invention.

Referring to FIGS. 2 and 3, there is illustrated in detail the multi-faceted polygon 20 of the present invention which rests atop a well known and presently utilized manufacturing device 120 or grinding machine for producing the polygon. The polygon 20 includes a body 130 which includes the aforementioned plurality of reflecting surfaces 50 around its periphery, and includes the step 90 which is integral with a mounting surface 140 of the polygon 20, which mounting surface is substantially perpendicular to the plurality of reflecting surfaces 50. It is instructive to note that, during manufacture of the polygon 20, certain particular physical characteristics of the polygon 20 should be developed so that the polygon 20 may be properly installed into the laser printer 10. More particularly, the center of rotation of the polygon 20 needs to be accurately and easily repositioned to coincide with the center of rotation of the motor shaft 80 after removal from the manufacturing device 120.

The step 90 functions as a means by which the center of rotation of the polygon 20 can be easily aligned with the center of rotation of the motor shaft 80. To create this step 90, the polygon 20 is placed on the grinding machine 120 and is circularly rotated. The radius (R) of the step 90, which is shorter in length than the radius of the polygon, is established from the center of rotation of the grinding machine 120. This radius (R) defines a circle as the polygon 20 is rotated, and as the polygon 20 is rotated, the polygon 20 is cut along this defined circle for forming the outer surface 100 of the step 90. The outer surface 100 is obviously cut to a depth which is less than the entire thickness of the polygon 20. The outer surface 100 will have substantially no runout if a runout indicator is placed abuttingly adjacent the outer surface 100.

Referring back to FIG. 1, with the step 90 defined, when the polygon 20 is placed on the shaft 80 of the laser printer 10, a runout indicator is again placed abuttingly adjacent the outer surface 100, and the polygon 20 is circularly rotated. The polygon 20 is repositioned so that the runout indicator indicates no runout (the center of rotation of the polygon 20 coincides with the center of rotation of the shaft 80 of the laser printer 10). The polygon 20 is then rigidly attached to the laser printer 10 via bolts 110 for maintaining this positional relationship.

Figure 4:
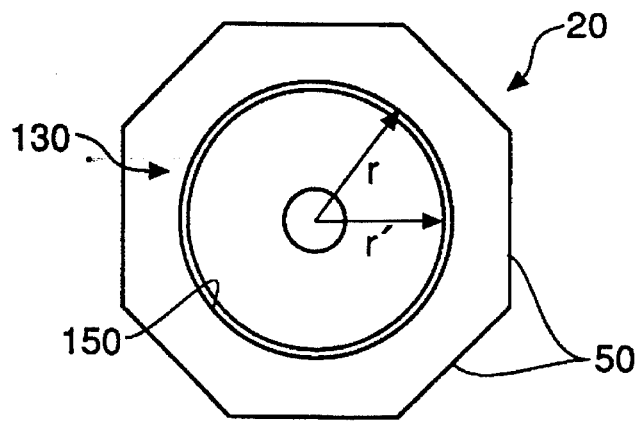
FIG. 4 is an a side view of an alternative embodiment of the polygon of the present invention.
Figure 5:
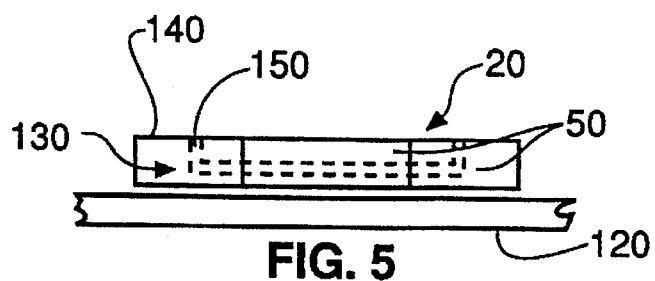
FIG. 5 is a top view of the alternative embodiment of the present invention.

Referring to FIGS. 4 and 5, there is illustrated an alternative embodiment of the present invention. In lieu of a step 90, a channel 150 is machined into and around the polygon 20 for indicating the center of rotation of the polygon 20. The channel 150 includes an outside radius (r) and an inside radius (r') either of which may be used to function as the equivalent of the radius (R) of the step 90 (i.e., the outer surface 100). Therefore, according to which radius is used, the surface defining the radius r or r' will have substantially no runout if a runout indicator is placed abuttingly adjacent the surface of the radius r or r'.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

Parts List:
10 laser printer
20 polygon
30 laser beam source
40 laser beam
50 reflecting surfaces
60 recording medium
70 center hole
80 shaft
90 step
100 outer surface
110 mounting bolts
120 grinding machine
130 body
140 top surface
150 channel

What is claimed is:

1. A method for manufacturing a polygon for a laser writer, comprising the steps of:
    (a) creating a scanning surface on the polygon;
    (b) creating a step for indicating the center of rotation for the polygon on a mounting surface of the polygon wherein step (b) further includes creating a surface on the step which includes substantially no runout when the polygon is rotated during manufacturing for providing a means for locating the center of rotation of the polygon; and
    (c) creating a plurality of holes through the polygon for mounting the polygon on a manufacturing device.

2. The method as in claim 1, wherein the step of creating a plurality of holes includes creating a center hole through the polygon.

3. A method for manufacturing a polygon for a laser writer, comprising the steps of:
    (a) creating a scanning surface on the polygon;
    (b) creating a channel for indicating the center of rotation for the polygon on a mounting surface of the polygon wherein step (b) further includes creating a surface on the channel which includes substantially no runout when the polygon is rotated during manufacturing for providing a means for locating the center of rotation of the polygon; and
    (c) creating a plurality of holes through the polygon for mounting the polygon on a manufacturing device.

4. A polygon for a laser writer, comprising:
    (a) a scanning surface positioned on a perimeter of the polygon for reflecting a laser beam; and
    (b) a step having a generally circular-shaped body, disposed on a mounting surface of the polygon that is substantially perpendicular to said scanning surface, for indicating a center of rotation for the polygon; wherein said step includes a thickness which is sufficient to receive an indicating device for measuring runout.

5. A polygon for a laser writer, comprising:
    (a) a scanning surface positioned on a perimeter of the polygon for reflecting a laser beam;
    (b) a circular-shaped channel disposed on a mounting surface of the polygon that is substantially perpendicular to said scanning surface for indicating a center of rotation for the polygon; wherein said channel includes a recessed portion which is sufficient to receive an indicating device for measuring runout.

6. The polygon as in claim 5, wherein said channel includes a generally smooth peripheral surface.

* * * * *